P. C. HEWITT.
VACUUM ELECTRIC APPARATUS.
APPLICATION FILED JUNE 24, 1916.

1,417,912.

Patented May 30, 1922.

3 SHEETS—SHEET 1.

WITNESS
Chas. F. Clagett
Thos. H. Brown

INVENTOR
Peter Cooper Hewitt
BY
ATTORNEY

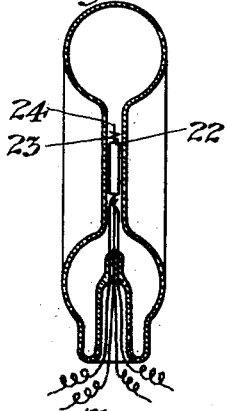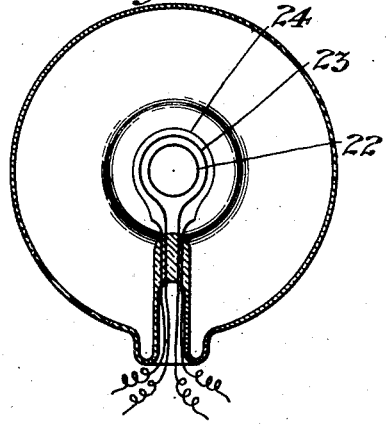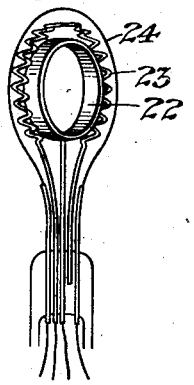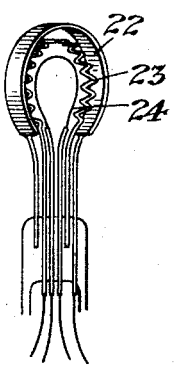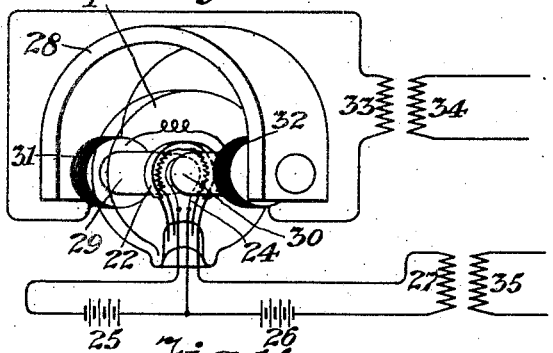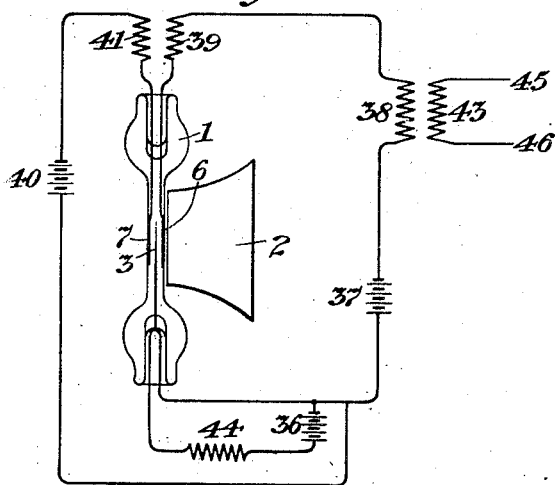

UNITED STATES PATENT OFFICE.

PETER COOPER HEWITT, OF RINGWOOD MANOR, NEW JERSEY.

VACUUM ELECTRIC APPARATUS.

1,417,912. Specification of Letters Patent. Patented May 30, 1922.

Application filed June 24, 1916. Serial No. 105,545.

*To all whom it may concern:*

Be it known that I, PETER COOPER HEWITT, a citizen of the United States, and resident of Ringwood Manor, county of Passaic, State of New Jersey, have invented certain new and useful Improvements in Vacuum Electric Apparatus, of which the following is a specification.

My invention relates to the general proportions of a vacuum, gas, or vapor device, for controlling the reactions within the device, and providing means for utilizing the electrical reactions in the space between the electrodes forming part of a circuit, for the production of electrical variations in an electric circuit corresponding to sound waves produced in the air and also such as convey articulate speech; variations in an electromagnetic field of force; and pulse or wave variations in another circuit.

One of the objects of my invention is to vary by sound waves, the geometrical dimensions of the surroundings of a vacuum, gas, or vapor, forming part of an electrical circuit between electrodes, the electrodes having suitable circuit connections.

Another object of my invention is to provide in a vacuum, gas, or vapor, forming part of a circuit between suitable electrodes, a short path across which a magnetic field of force can be made to act.

My invention comprises the construction of the vacuum device in such a manner that it has two surfaces substantially parallel to, and facing each other, leaving a narrow space between them, in which are mounted at least one electrode adapted to act as a cathode, and at least one electrode to act as an anode.

I have discovered that varying the size of the space around or between electrodes in a vacuum, gas or vapor device changes the electrical characteristics of the circuit between the electrodes and this phenomenon can be made use of for the reproduction of variations.

In one of its forms, it comprises the vibration of the parallel surfaces by sound waves projected against either one or both faces, which may vary the distance between electrodes located between the faces. It also comprises locating magnets in such a manner that the field of force crosses the space between the parallel walls; and in varying the magnetic field either by variations of distance between the pole pieces of the magnets, or by variations of current in a coil or coils of wire surrounding the pole pieces.

The electrical circuits that may be used in connection with my invention are many, and I do not wish to be limited to the circuits described herein.

Figure 1:
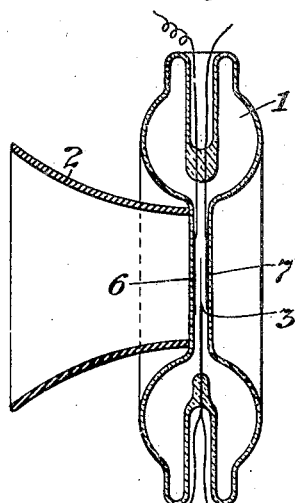
Figure 2:
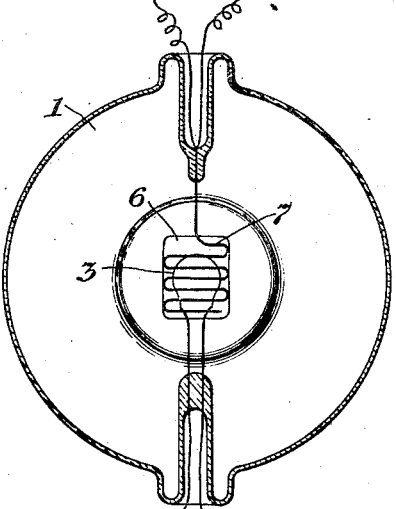
Figure 3:
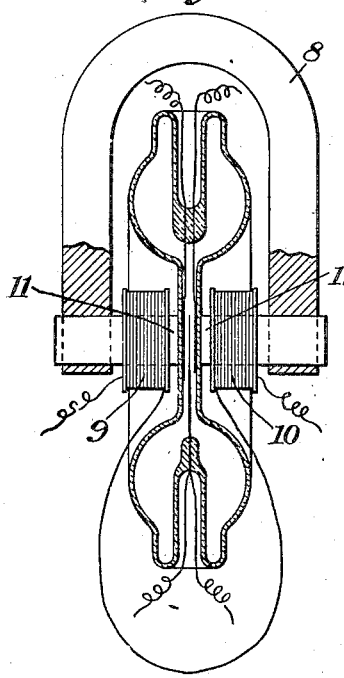
Figure 4:
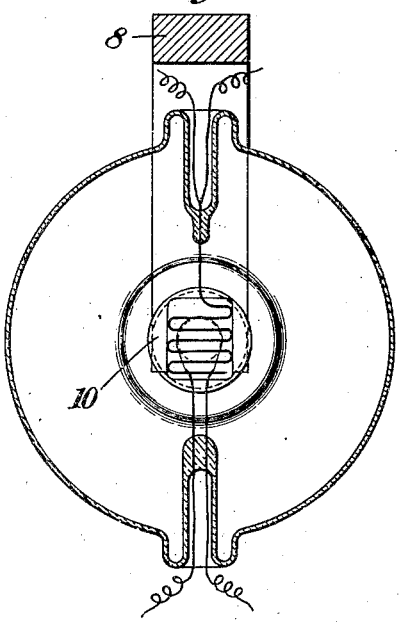
Figure 5:
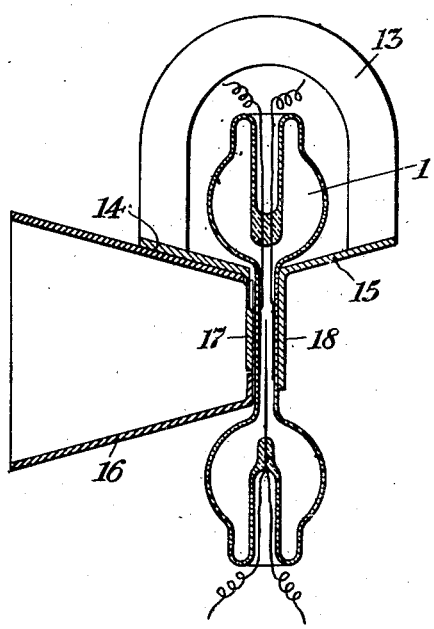
Figure 6:
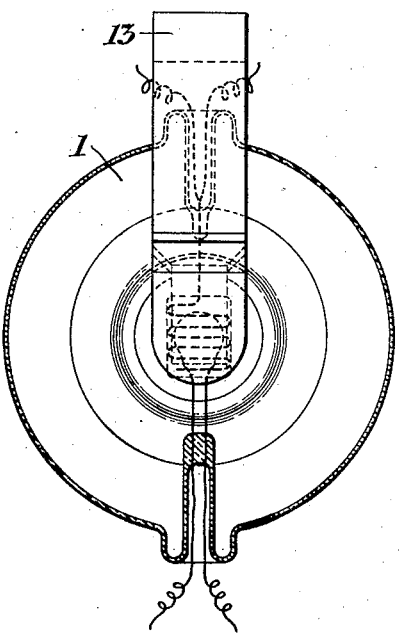
Figure 7:
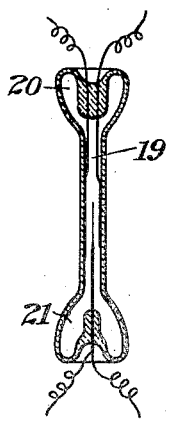
Figure 8:
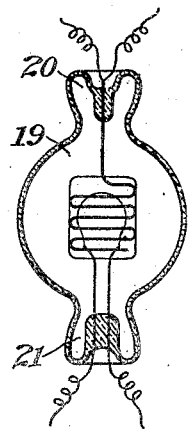

In the drawings, Fig. 1 is a cross-section and Fig. 2 a cross-section at right angles, illustrating one form of my invention. Figs. 3 and 4 are similar views wherein are shown how a magnet may be employed. Figs. 5 and 6 show another method of utilizing magnetic variations. Figs. 7 and 8 are cross sectional views taken at right angles to each other, of a modified form of a vacuum, gas, or vapor device. Figs. 9 and 10 show sectional views, side and rear, of a slightly different form, and Fig. 11 shows the construction of the electrodes on an enlarged scale. In Fig. 12 is shown an alternative arrangement of electrodes. Fig. 13 illustrates an arrangement of circuits wherein the variations in one circuit are reproduced in another circuit. Fig. 14 illustrates the use of my invention at a transmitting station of a telephone system.

Referring to Figs. 1 and 2, 1 is a container, preferably of glass; 2 is a mouth-piece; 3 is a filament adapted to be rendered incandescent by currents through leads 4 and 5; 6 is a plate electrode, and 7 is a grid shaped electrode; 6 and 7 may be attached to the glass walls of the receptacle 1, or, they may be separated from the walls by a small space.

In Figs. 3 and 4, the magnet 8, having coils 9 and 10 on pole pieces 11 and 12, is shown applied to a vacuum, gas, or vapor device as shown in Figs. 1 and 2.

In Figs. 5 and 6, I show a magnet 13, with pole pieces 14 and 15, and a mouth piece 16, in connection with the vacuum device of Fig. 1. Pole piece 14 has a flexible extension 17, which vibrates according to any sound waves in the mouth-piece 16, thereby varying the flux between extension 17 and extension 18 of the pole piece 15 across the gap between the parallel sides of the container 1.

In Figs. 7 and 8 the container 19 is shown as two discs of glass fastened together at their outside edges, with a narrow space between, and having enlargements 20 and 21 at the top and bottom for bringing out the lead wires from the electrodes.

In Figs. 9 and 10, 23, 22 and 24, are electrodes in a container, wherein any flow of current between them is in a radial direction, and parallel to the parallel surfaces of the container.

Fig. 11 illustrates the arrangement on an enlarged scale, of the electrodes of Figs. 9 and 10; 22 is a cylindrical ring; 23 is a ring made of wire bent in the form of a grid; 24 is a filament.

In Fig. 12 another arrangement of electrodes for the device of Figs. 9 and 10 is shown. In this figure, the filament 24, is nearest the center and the cylindrical band 22, is on the outside.

In Fig. 13 I show a device with electrodes arranged as in Fig. 12, with a magnet operating thereon and electrical circuit connections for the reproduction of current variations the grid 23 playing no part in the operation. The operation is as follows: 25 is a battery which maintains the filament 24 at a temperature of incandescence; 26 is a battery which maintains current flow between plate 22 and filament 24 through primary 27 of a transformer; 28 is a permanent magnet, the pole pieces 29 and 30 of which, are approached close to the parallel faces of the container 1; 31 and 32 are windings located on pole pieces 29 and 30. When electrical variations are introduced in the circuit 31, 32, and the secondary of the transformer 33, from the primary 34 of a transformer, corresponding variations in the electrical characteristics of the vacuum, gas, or vapor, in the container 1, are caused; and the current flowing in circuit 26, 24 and 27 is made to vary; thereby reproducing in the secondary 35, electrical variations corresponding to those received at 34.

I show in Fig. 14 the device of Fig. 1 operating as a transmitter in a telephone circuit. Battery 36 acting through resistance 44, maintains the filament in condition to act as a cathode of the circuit 37, 38, 39, 6, and 3, in which, 37, is a battery having a sufficient voltage to keep the proper amount of current flowing. 40 is a battery, the object of which is to maintain the proper potential in circuit 41, 7, 3, and lead 42. When sound variations are applied to mouth piece 2, variations in the conductivity of the path from electrode 6 to cathode 3 are caused. This varies the current in circuit 6, 3, 38 and 39. The variations in the circuit act through transformer coils 39 and 41 to cause variations in the circuit 41, 7, 3, 42 and 40. Due to the action of the vacuum, gas, or vapor device, variations in the latter circuit react on the circuit 6, 3, 37, 38 and 39, causing still greater variations in this circuit. The variations are supplied to the line 45 and 46 through the agency of the transformer coils 38 and 39.

I claim as my invention:

1. In an electric apparatus, a container having wall portions terminating in parallel flat surfaces, an electric circuit traversing the space between said surfaces, and means applied to said parallel surfaces for controlling the reactions in said container.

2. In an electric apparatus, a container having wall portions terminating in parallel flat surfaces, an electric circuit traversing the space between said surfaces, means applied to said parallel surfaces for controlling the reactions in said container, and means for producing electrical variations from said reactions.

3. In an electric apparatus, a container having wall portions terminating in parallel flat surfaces, an electric circuit traversing the space between said surfaces, means applied to said parallel surfaces for controlling the reactions in said container, means for producing electrical variations from said reactions, and means for utilizing said electrical variations.

4. An electric device comprising a container having re-entrant portions terminating in parallel flat surfaces, and a positive and a negative electrode in the space between said parallel surfaces.

5. An evacuated electric apparatus having container walls terminating in parallel flat surfaces, an electric circuit traversing the space between said surfaces, and means applied to said parallel surfaces for varying the geometrical dimensions of the surroundings of said electric circuit.

6. An evacuated electric apparatus having parallel reentrant flat surfaces, an electric circuit traversing the space between said surfaces, and means for varying by sound waves the geometrical dimensions of the surroundings of said electrical circuit.

7. An evacuated electric apparatus comprising a container having parallel flat surfaces, an electric circuit traversing the space between said surfaces, and means applied to said parallel surfaces for varying the geometrical dimensions of the space between said surfaces.

8. An evacuated electric apparatus comprising a container having parallel reentrant flat surfaces, an electric circuit traversing the space between said surface, and means for varying by sound waves the geometrical dimensions of the space between said surfaces.

9. An electric device comprising a container having wall portions terminating in parallel flat surfaces, electrodes in the space between said surfaces, and means applied to said parallel surfaces for varying the distance between said surfaces.

10. An evacuated electric apparatus comprising a container having parallel reentrant flat surfaces, electrodes in the space between said surfaces, and means for varying the distance between said electrodes.

11. An evacuated electric apparatus comprising a container having wall portions terminating in parallel flat surfaces, a positive and a negative electrode in the space between said surfaces, a magnetic field of force applied to said parallel surfaces, and means for varying said magnetic field.

12. An evacuated electric apparatus comprising a container having parallel reentrant flat surfaces, an electric circuit traversing the space between said surfaces, a magnet having its poles located on the outside walls of said parallel surfaces, and means for varying the distance between said pole pieces.

13. An evacuated electric apparatus comprising a container having parallel reentrant flat surfaces, an electric circuit traversing the space between said surfaces, a magnet having pole pieces for creating a field of force across said parallel surfaces, and means for causing variations in the magnetic field due to electrical variations impressed on said poles.

14. In an electric apparatus, a container having reentrant portions terminating in parallel surfaces, a positive and a negative electrode in the space between said parallel surfaces, a magnet having its pole pieces so located as to cause a magnetic field of force to extend across the space between the parallel walls, and means for varying the magnetic field of force.

15. In an electric apparatus, a container having reentrant portions terminating in substantially parallel surfaces, a positive and a negative electrode in the space between said parallel surfaces, and a magnet having its pole pieces so located as to cause a magnetic field of force to extend across the space between the parallel surfaces.

16. In an electric apparatus, a container having reentrant portions terminating in substantially parallel surfaces, a positive and a negative electrode in the space between said parallel surfaces, a magnet having its pole pieces so located as to cause a magnetic field of force to extend across the space between the parallel surfaces and means for varying the magnetic field.

Signed at New York, in the county of New York, and State of New York, this 19th day of June, A. D. 1916.

PETER COOPER HEWITT.

Witnesses:
WALTER E. S. BRADLEY,
R. A. HEWITT.